United States Patent
Chen et al.

(10) Patent No.: US 11,609,616 B2
(45) Date of Patent: Mar. 21, 2023

(54) PORTABLE ELECTRONIC APPARATUS HAVING DETACHABLE KEY CAP

(71) Applicant: Acer Incorporated, New Taipei (TW)

(72) Inventors: Hung-Chi Chen, New Taipei (TW); Shun-Bin Chen, New Taipei (TW); Huei-Ting Chuang, New Taipei (TW); Kuo-Lun Huang, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/476,453

(22) Filed: Sep. 15, 2021

(65) Prior Publication Data
US 2022/0261047 A1    Aug. 18, 2022

(30) Foreign Application Priority Data
Feb. 18, 2021   (TW) .................. 110105492

(51) Int. Cl.
*G06F 1/16* (2006.01)
*G06F 3/02* (2006.01)
*H04N 5/225* (2006.01)
*H01H 13/83* (2006.01)

(52) U.S. Cl.
CPC .......... *G06F 1/1686* (2013.01); *G06F 1/1669* (2013.01); *G06F 3/0216* (2013.01); *G06F 3/0219* (2013.01); *H01H 13/83* (2013.01); *H04N 5/2257* (2013.01); *G06F 1/1616* (2013.01)

(58) Field of Classification Search
CPC .... G06F 1/1686; G06F 1/1669; G06F 3/0216; G06F 3/0219; G06F 1/1616; H01H 13/83; H04N 5/2257
See application file for complete search history.

(56) References Cited

U.S. PATENT DOCUMENTS

| | | | |
|---|---|---|---|
| 6,654,050 B2 * | 11/2003 | Karube ................ | H04N 7/142 348/E7.079 |
| 2003/0058363 A1 * | 3/2003 | Boyden ................ | H04N 7/144 348/375 |
| 2005/0128284 A1 * | 6/2005 | Hoffer ................. | H04N 7/142 348/14.02 |
| 2018/0188773 A1 * | 7/2018 | Perelli ................. | G06F 1/1692 |
| 2018/0295328 A1 * | 10/2018 | Tucker ................ | G03B 17/04 |
| 2020/0314299 A1 * | 10/2020 | Okuley ................ | H04N 7/144 |
| 2021/0183594 A1 * | 6/2021 | Lin ...................... | H01H 3/122 |
| 2021/0255711 A1 * | 8/2021 | Wang ................... | G06F 3/0213 |

* cited by examiner

*Primary Examiner* — Amr A Awad
*Assistant Examiner* — Maheen I Javed
(74) *Attorney, Agent, or Firm* — JCIPRNET

(57) ABSTRACT

A portable electronic apparatus including a first body, a second body, and a keyboard is provided. The second body is pivotally connected to the first body. The keyboard is disposed on the first body and includes a plurality of key structures. One of the key structures includes an elevating platform, a key cap, and a camera. The key cap is detachably mounted to the elevating platform, and the camera is mounted at one side of the key cap facing the elevating platform. After the camera is detached from the elevating platform together with the key cap, the camera is mounted and positioned to the second body together with the key cap, and at least a portion of the camera is exposed to the outside.

9 Claims, 8 Drawing Sheets

PORTABLE ELECTRONIC APPARATUS HAVING DETACHABLE KEY CAP

CROSS-REFERENCE TO RELATED APPLICATION

This application claims the priority benefit of Taiwan application serial no. 110105492, filed on Feb. 18, 2021. The entirety of the above-mentioned patent application is hereby incorporated by reference herein and made a part of this specification.

BACKGROUND

Technical Field

The disclosure relates to an electronic apparatus, and in particular, to a portable electronic apparatus.

Description of Related Art

Nowadays, notebook computers have become an indispensable tool for people owing to features such as high computing efficiency and portability. Generally, a notebook computer includes the first body having the logic computing capability and the second body having the display capability. The second body is pivotally connected to the first body to be rotated and unfolded relative to the first body. In order to facilitate a user to perform video chatting or to obtain an external image, generally, the camera is designed to be disposed around the second body, so it is difficult to meet the design need of a narrow frame. Besides, the position or orientation of the camera on the second body may not be flexibly adjusted most of the time, so a user may experience inconvenient user operation.

At present, external cameras applied to notebook computers are available, and a user may install an external camera to any position on the second body according to personal needs. Nevertheless, the external camera may be easily lost or is left not to be carried after being detached from the second body. Therefore, unfavorable mechanical integration is provided between existing notebook computers and external cameras.

SUMMARY

The disclosure provides a portable electronic apparatus exhibiting favorable operational flexibility and providing mechanical integration.

The disclosure provides a portable electronic apparatus including a first body, a second body, and a keyboard. The second body is pivotally connected to the first body. The keyboard is disposed on the first body and includes a plurality of key structures. One of the key structures includes an elevating platform, a key cap, and a camera. The key cap is detachably mounted to the elevating platform, and the camera is mounted at one side of the key cap facing the elevating platform. After the camera is detached from the elevating platform together with the key cap, the camera is mounted and positioned to the second body together with the key cap, and at least a portion of the camera is exposed to the outside.

To sum up, in the portable electronic apparatus provided by the disclosure, the camera is integrated with the key cap of the keyboard. In this way, a user may detach the key cap integrated with the camera from the keyboard and mounts and positions the key cap integrated with the camera to the second body according to personal needs for performing video chatting or obtaining an external image. When the user does not need to use the camera, the user may detach the key cap integrated with the camera from the second body and mounts the key cap integrated with the camera back to the keyboard, and in this way, the camera is prevented from being lost or is prevented from not being carried. Therefore, in the disclosure, the portable electronic apparatus not only exhibits favorable operational flexibility but also provides favorable mechanical integration.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
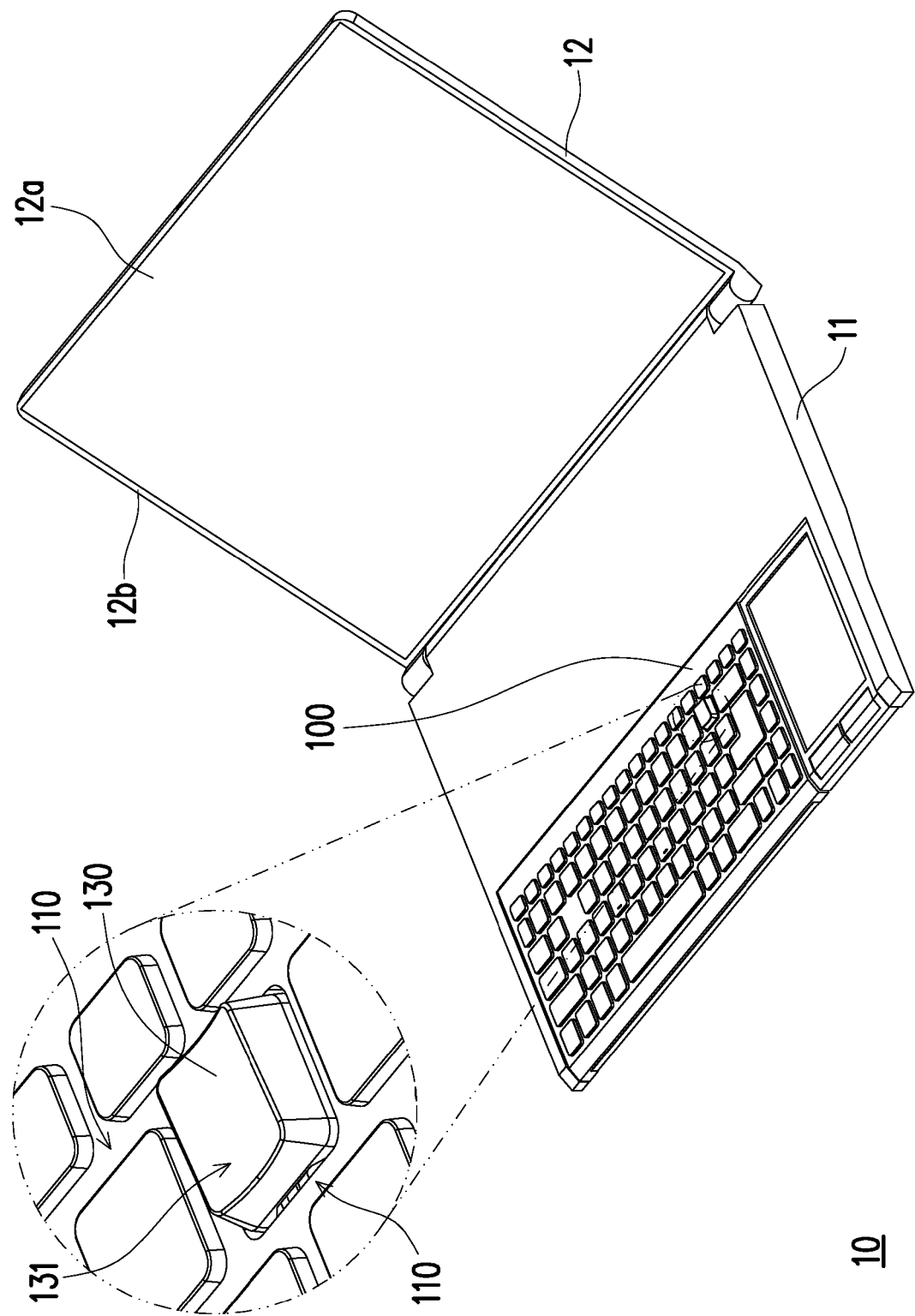
FIG. 1A is a schematic view of a portable electronic apparatus according to an embodiment of the disclosure.
Figure 1B:
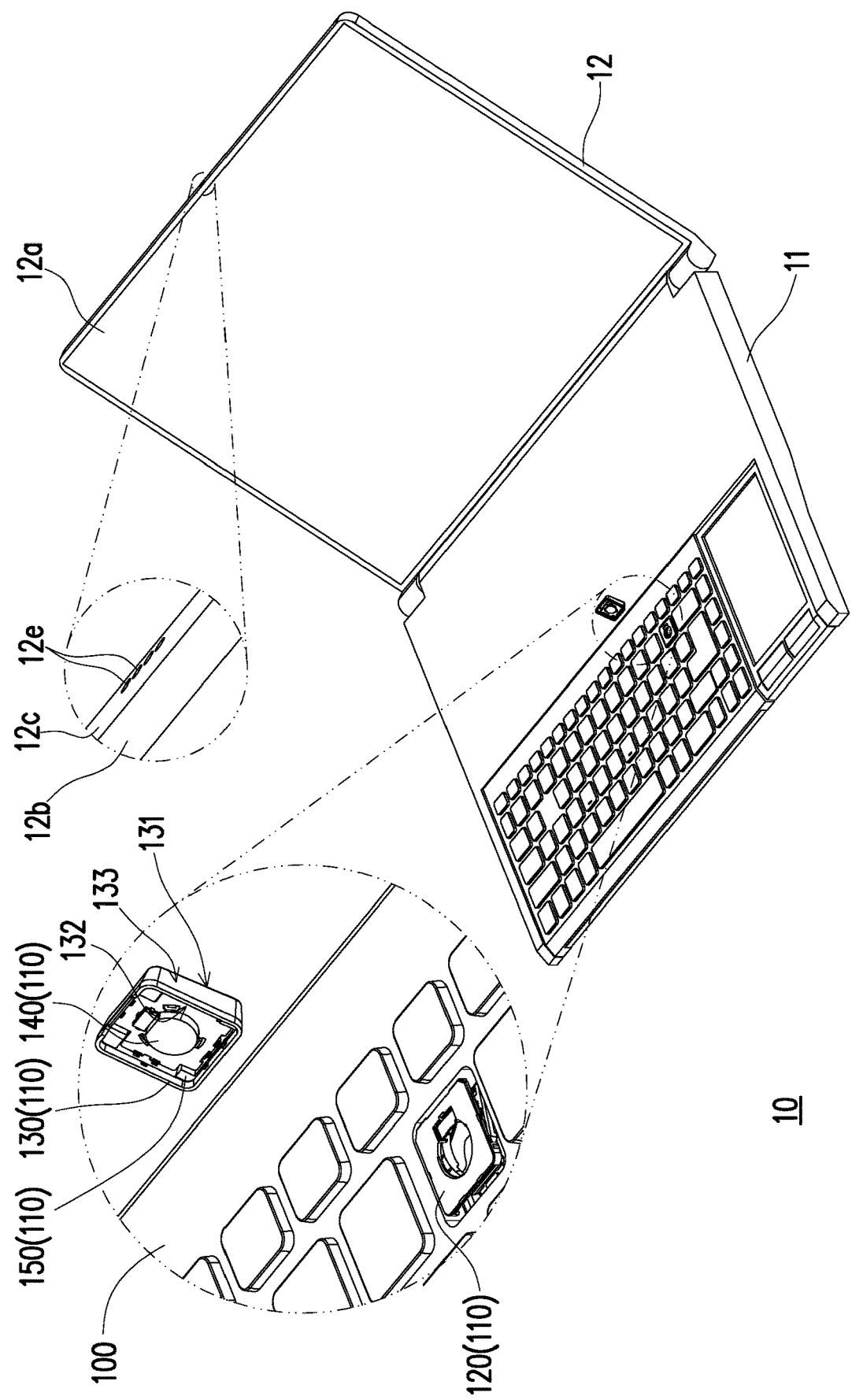
FIG. 1B is a schematic view of a key cap of FIG. 1A detached from a keyboard.
Figure 1C:
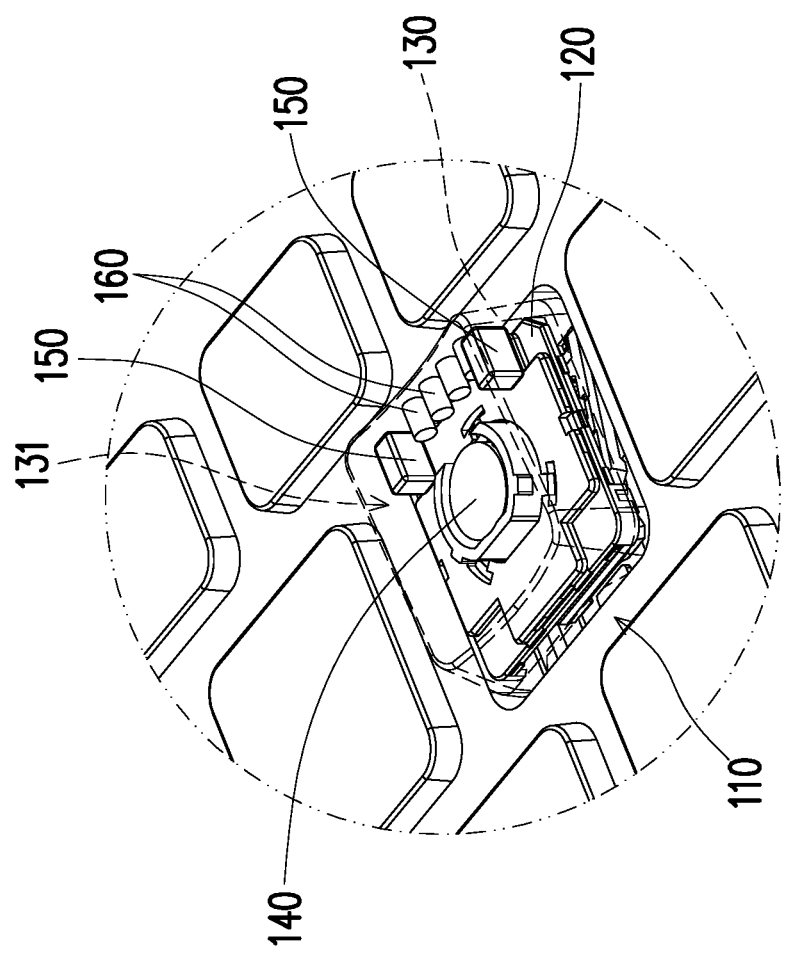
FIG. 1C is a schematic view of an enlarged local portion of a key structure of FIG. 1A

FIG. 1A is a schematic view of a portable electronic apparatus according to an embodiment of the disclosure. FIG. 1B is a schematic view of a key cap of FIG. 1A detached from a keyboard. FIG. 1C is a schematic view of an enlarged local portion of a key structure of FIG. 1A Note that in order to clearly present internal arrangement of a key structure 110, a key cap 130 in FIG. 1C is shown in dashed lines. With reference to FIG. 1A to FIG. 1C, in this embodiment, a portable electronic apparatus 10 may be a notebook computer and includes a first body 11, a second body 12, and a keyboard 100. The first body 11 has a logic computing capability, and the keyboard 100 is disposed on the first body 11 to act as a physical input and operation interface. The second body 12 may be a display having a display capability and is pivotally connected to the first body 11 to be rotated and unfolded relative to the first body 11.

Further, the second body 12 has a display region 12a and a frame region 12b surrounding the display region 12a, and the frame region 12b is not provided with an opening hole for a camera to receive light. In this way, integrity of an appearance of the second body 12 is maintained, and the design need of a narrow frame is thus met. In other words, the second body 12 is not provided with a fixed camera. On the other hand, the portable electronic apparatus 10 is integrated with a detachable camera, so that a user may mount and position the detachable camera to the second body 12 according to personal needs such as performing video chatting or obtaining an external image. It thus can be seen that the portable electronic apparatus 10 exhibits favorable operational flexibility.

To be specific, the detachable camera is integrated with the keyboard 100. When the user does not need to use the detachable camera, the user may detach the detachable camera from the second body 12 and mount the detachable camera back to the keyboard 100, and in this way, the detachable camera is prevented from being lost or is prevented from not being carried. It thus can be seen that the portable electronic apparatus 10 provides favorable mechanical integration.

With reference to FIG. 1A to FIG. 1C, the keyboard 100 includes a plurality of key structures 110, and at least one of the key structures 110 includes an elevating platform 120, the key cap 130, and a camera 140. The key cap 130 may be mounted on the elevating platform 120 through a magnetic attraction mechanism or an engagement mechanism to facilitate detachment of the key cap 130 from the elevating platform 120 performed by the user. In addition, the camera 140 is mounted on one side of the key cap 130 facing the elevating platform 120. When the key cap 130 is installed on the elevating platform 120, the key cap 130 covers the camera 140, so the camera 140 is not exposed to the outside.

Figure 1D:
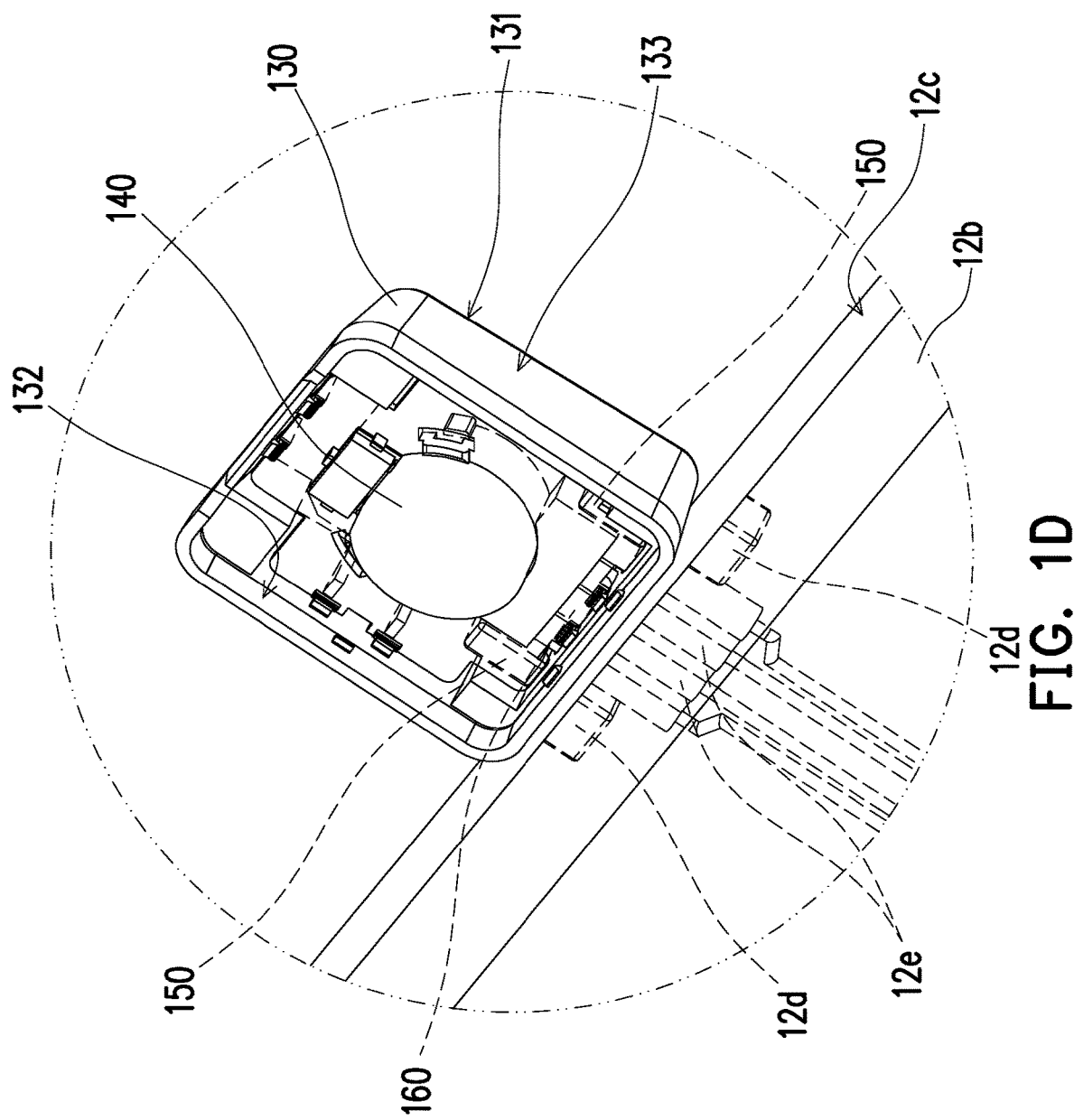
FIG. 1D is a schematic view of an enlarged local portion of the key cap of FIG. 1B installed on a second body.
Figure 1E:
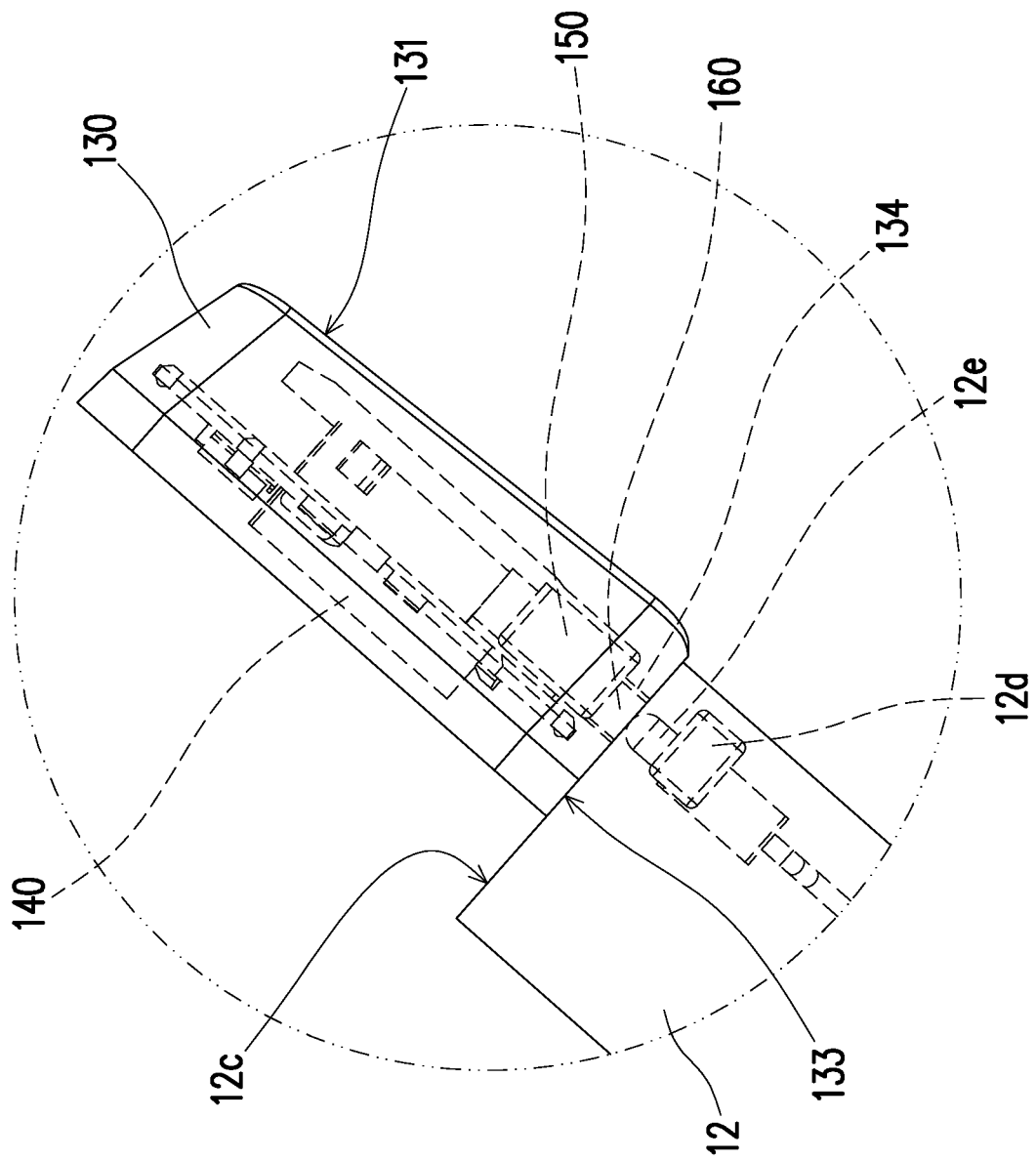
FIG. 1E is a side schematic view of FIG. 1D.

FIG. 1D is a schematic view of an enlarged local portion of the key cap of FIG. 1B installed on a second body. FIG. 1E is a side schematic view of FIG. 1D. With reference to FIG. 1B, FIG. 1D, and FIG. 1E, after the camera 140 is detached from the elevating platform 120 together with the key cap 130, the camera 14 is mounted and positioned to the second body 12 together with the key cap 130. To be specific, the second body 12 is further provided with a lateral side 12c surrounding the frame region 12b, and the camera 140 may be mounted and positioned to the lateral side 12c together with the key cap 130. Besides, the key cap 130 has a pressing surface 131 configured to receive user operation and a bottom opening 132 opposite to the pressing surface 131, and the camera 140 is exposed to the outside through the bottom opening 132 to obtain light from the outside. Although the key cap 130 is detached from the elevating platform 120, but the elevating platform 120 may still provide such key structure 110 with inherent inputting and operating functions.

In this embodiment, the second body 12 includes a first magnet 12d corresponding to the lateral side 12c, and the key structure 110 further includes a second magnet 150 mounted to the key cap 130. Through magnetic attraction between the second magnet 150 and the first magnet 12d, the key cap 130 may be mounted and positioned to the lateral side 12c of the second body 120. In addition, the key cap 130 further includes a side surface 133 located between the pressing surface 131 and the bottom opening 132, and the side surface 133 surrounds the pressing surface 131. When the key cap 130 is mounted and positioned to the lateral side 12c of the second body 120, the side surface 133 of the key cap 130 contacts the lateral side 12c of the second body 120.

With reference to FIG. 1B, FIG. 1D, and FIG. 1E, the second body 12 further includes a first electrical connection component 12e adjacent to the first magnet 12d. One portion of the first electrical connection component 12e is located in the second body 12, and the other portion of the first electrical connection component 12e is exposed outside the lateral side 12c to from a conductive terminal. On the other hand, the key structure 110 further includes a second electrical connection component 160 mounted to the key cap 130. The second electrical connection component 160 is electrically connected to the camera 140, and the second electrical connection component 160 may be a combination of a circuit board and the conductive terminal.

To be specific, the key cap 130 further includes a through hole 134 penetrating through the side surface 133, and the conductive terminal in the second electrical connection component 160 is inserted in the through hole 134. When the second magnet 150 is magnetically attracted to the first magnet 12d and the side surface 133 of the key cap 130 contacts the lateral side 12c of the second body 120, the second electrical connection component 160 electrically contacts the first electrical connection component 12e. In this way, power or a signal may be transmitted to the camera 140 through the first electrical connection component 12e and the second electrical connection component 160, and the signal may be transmitted to the first body 11 from the camera 140 through the second electrical connection component 160 and the first electrical connection component 12e. That is, the first electrical connection component 12e may extend to the first body 11 from the second body 12.

For instance, a number of the first magnet 12d is two, the first electrical connection component 12e and the two first magnets 12d are disposed at the same side of the second body 12, and the first electrical connection component 12e is located between the two first magnets 12d. In addition, a number of the second magnet 150 is two, the second electrical connection component 160 and the two second magnets 150 are disposed at the same side of the key cap 130, and the second electrical connection component 160 is located between the two second magnets 150.

Figure 2A:
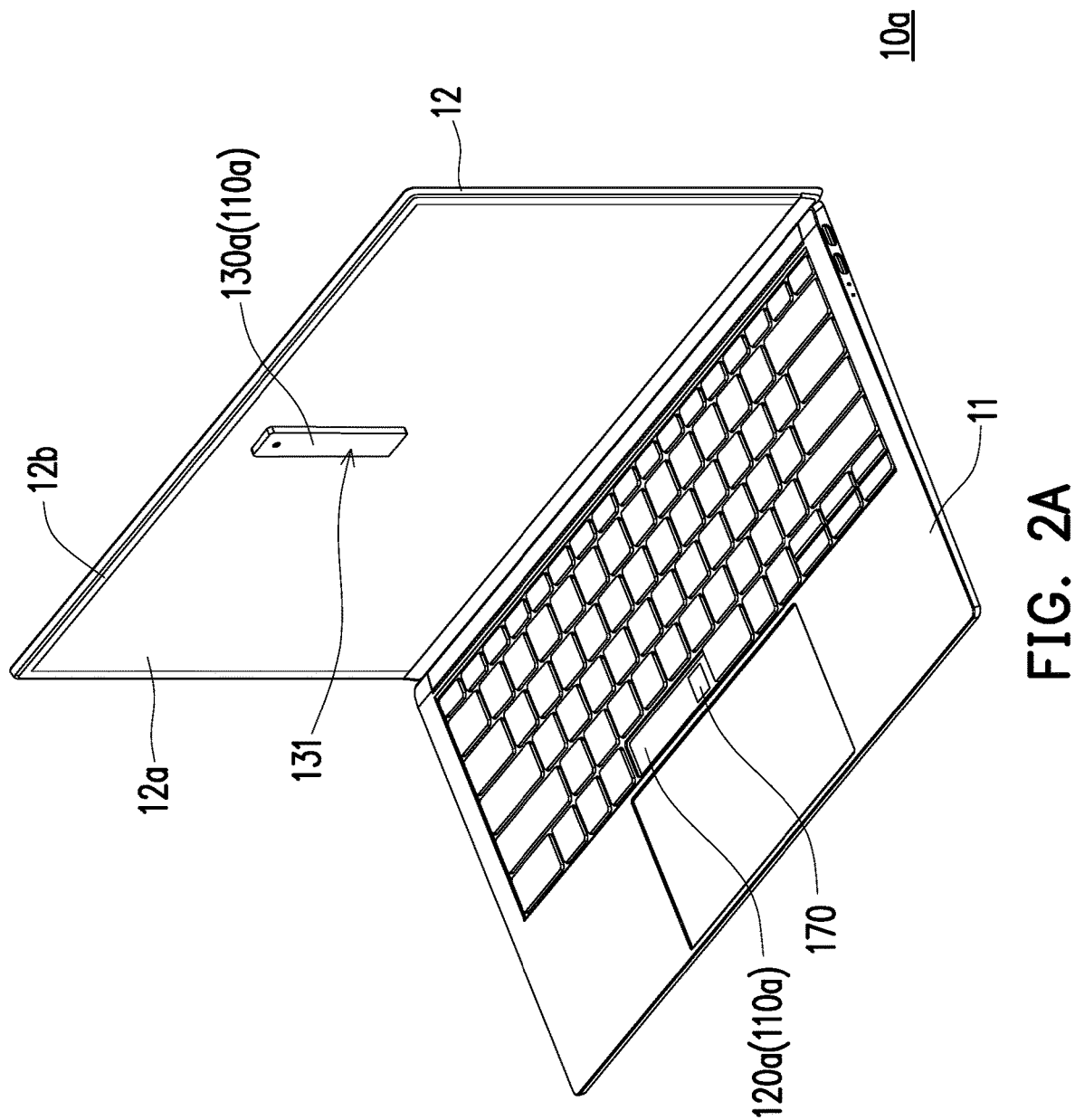
FIG. 2A is a schematic view of a portable electronic apparatus according to another embodiment of the disclosure.
Figure 2B:
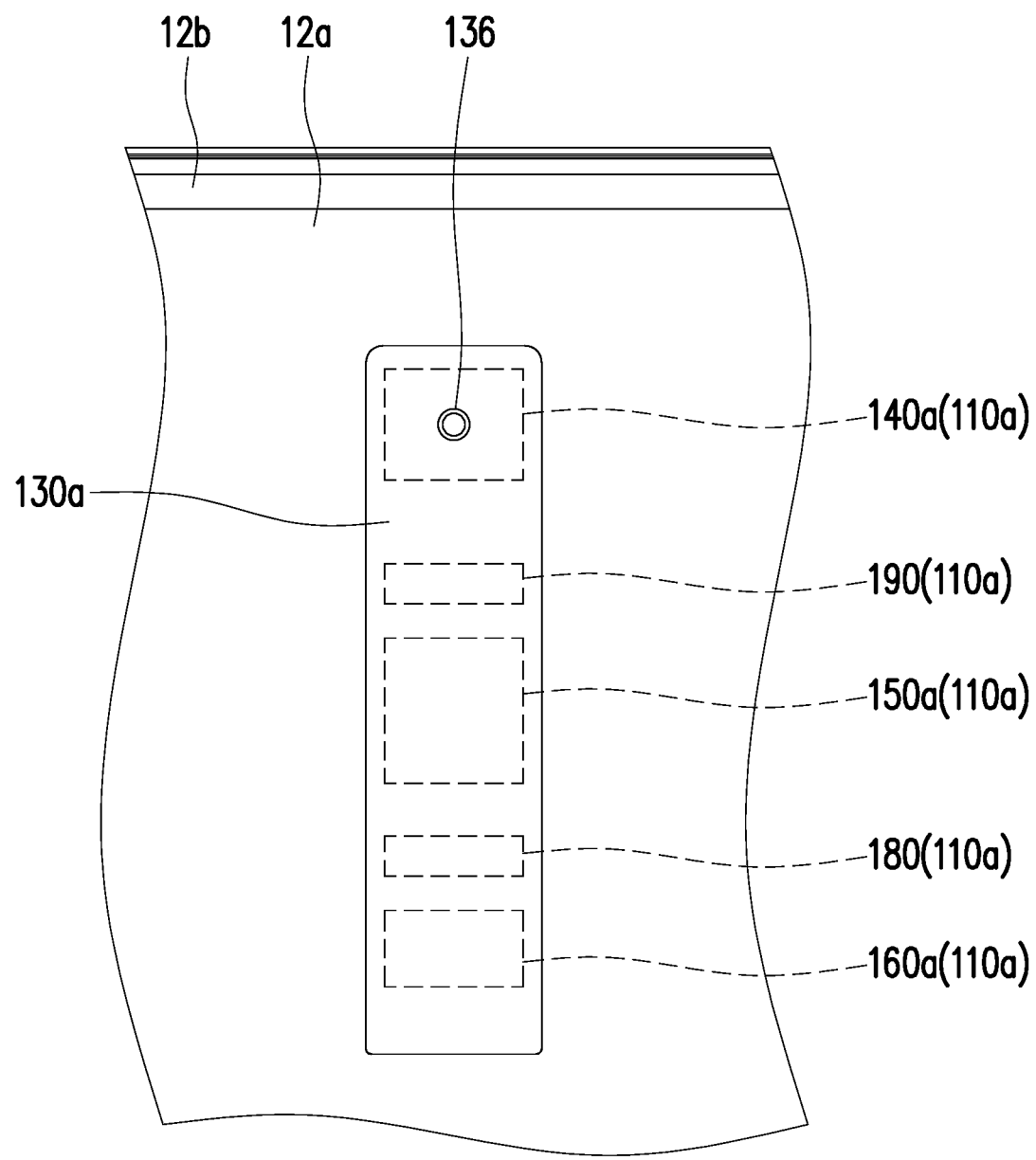
FIG. 2B is a front schematic view of an enlarged local portion of FIG. 2A.
Figure 2C:
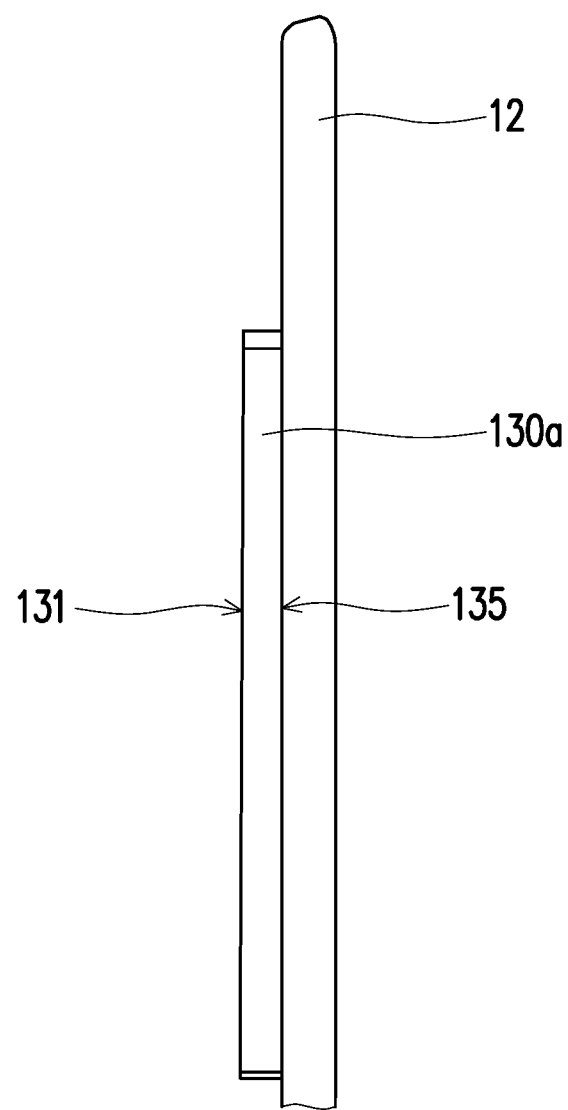
FIG. 2C is a side schematic view of the enlarged local portion of FIG. 2A.

FIG. 2A is a schematic view of a portable electronic apparatus according to another embodiment of the disclosure. FIG. 2B is a front schematic view of an enlarged local portion of FIG. 2A. FIG. 2C is a side schematic view of the enlarged local portion of FIG. 2A. With reference to FIG. 2A to FIG. 2C, a design principle of a portable electronic apparatus 10a of this embodiment is similar to that of the portable electronic apparatus 10 of the previous embodiments, and a difference therebetween is that the second body 12 of the portable electronic apparatus 10a is not provided with a magnet in this embodiment. A frame inside the second body 12 may be made of a magnetic material to allow a key structure 110a to be magnetically attracted to the second body 12 after being detached from an elevating platform 120a and to be mounted and positioned to a display region 12a or a frame region 12b.

With reference to FIG. 2A to FIG. 2C again, the key structure 110a includes a first electrical connection component 170, a magnet 150a, a second electrical connection component 160, and a battery 180. The first electrical connection component 170 is mounted to the elevating platform 120a and is exposed to a surface of the elevating platform 120a configured to carry a key cap 130a. The magnet 150a, the second electrical connection component 160a, and the battery 180 are mounted to the key cap 130a. The battery 180 is electrically connected to the camera 140a and the second electrical connection component 160a. On the other hand, the key cap 130a has a bottom surface 135 opposite to the pressing surface 131 and a through hole 136 penetrating through the pressing surface 131, and the second electrical connection component 160a is exposed to the bottom surface 135.

When the key cap 130a is mounted to the elevating platform 120a, the bottom surface 135 of the key cap 130a contacts the elevating platform 120a, and the second electrical connection component 160a electrically contacts the first electrical connection component 170 to transmit power to the battery 180 from the first body 11 through the first electrical connection component 170 and the second electrical connection component 160a. In addition, the battery 180 may transmit power to the camera 140a.

In this embodiment, the camera 140a overlaps the through hole 136, so that the camera 140a is allowed to obtain external light through the through hole 136. When the key cap 130a is detached from the elevating platform 120a and is magnetically attracted and positioned to the second body 12 through the magnet 150a, the bottom surface 135 of the key cap 130a contacts the display region 12a or the frame region 12b, and the pressing surface 131 and the through hole 136 are exposed to the outside, so that the camera 140a is allowed to obtain external light through the through hole 136. That is, at least a portion of the camera 140a is exposed to the outside through the through hole 136.

The key structure 110a further includes a wireless transmission device 190 mounted to the key cap 130a, and the camera 140a is electrically connected to the wireless transmission device 190. The wireless transmission device 190 may be configured to use Wi-Fi, Bluetooth, infrared, other wireless transmission technologies, or other wireless communication technologies. As such, the camera 140a may transmit a signal to the first body 11 or the second body 12 through the wireless transmission device 190 or may receive a signal from the first body 11 or the second body 12.

In view of the foregoing, in the portable electronic apparatus provided by the disclosure, the camera is integrated with the key cap of the keyboard. In this way, a user may detach the key cap integrated with the camera from the keyboard and mounts and positions the key cap integrated with the camera to the second body according to personal needs for performing video chatting or obtaining an external image. When the user does not need to use the camera, the user may detach the key cap integrated with the camera from the second body and mounts the key cap integrated with the camera back to the keyboard, and in this way, the camera is prevented from being lost or is prevented from not being carried. Therefore, in the disclosure, the portable electronic apparatus not only exhibits favorable operational flexibility but also provides favorable mechanical integration.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A portable electronic apparatus, comprising:
a first body;
a second body, pivotally connected to the first body; and
a keyboard, disposed on the first body, comprising a plurality of key structures, wherein one of the key structures comprises an elevating platform, a key cap, and a camera, the key cap is detachably mounted to the elevating platform, and the camera is mounted at one side of the key cap facing the elevating platform,
wherein the camera is mounted and positioned to the second body together with the key cap after the camera is detached from the elevating platform together with the key cap, and at least a portion of the camera is exposed to an outside,
the second body has a display region and a frame region surrounding the display region, and the key cap detached from the elevating platform is only mounted and positioned to the display region.

2. The portable electronic apparatus according to claim 1, the second body comprises a first magnet, the one of the key structures further comprises a second magnet mounted to the key cap, and the key cap is magnetically attracted to the first magnet through the second magnet to be mounted to the second body.

3. The portable electronic apparatus according to claim 2, the second body further comprises a first electrical connection component adjacent to the first magnet, the one of the key structures further comprises a second electrical connection component mounted to the key cap, the second electrical connection component is electrically connected to the camera, the second magnet is magnetically attracted to the first magnet, and the second electrical connection component electrically contacts the first electrical connection component.

4. The portable electronic apparatus according to claim 3, the first electrical connection component is exposed to a lateral side of the second body, the key cap has a through hole, and the second electrical connection component is inserted in the through hole.

5. The portable electronic apparatus according to claim 3, a number of the first magnet is two, the first electrical connection component is located between the two first magnets, a number of the second magnet is two, and the second electrical connection component is located between the two second magnets.

6. The portable electronic apparatus according to claim 1, the one of the key structures further comprises a magnet mounted to the key cap, an electrical connection component mounted to the key cap, and a battery mounted to the key cap, the battery is electrically connected to the camera and the electrical connection component, the key cap is mounted and positioned to the second body after the camera is detached from the elevating platform together with the key cap, and the magnet is magnetically attracted to the second body.

7. The portable electronic apparatus according to claim 6, the one of the key structures further comprises a wireless transmission device mounted to the key cap, and the camera is electrically connected to the wireless transmission device.

8. The portable electronic apparatus according to claim 1, the key cap has a pressing surface, a bottom surface facing away from the pressing surface, and a through hole penetrating through the pressing surface, the camera overlaps the through hole, and the key cap detached from the elevating platform contacts the display region through the bottom surface.

9. The portable electronic apparatus according to claim 1, the key cap has a pressing surface and a side surface surrounding the pressing surface, the second body has a display region, a frame region surrounding the display region, and a lateral side surrounding the frame region, and the key cap detached from the elevating platform contacts the lateral side through the side surface.

* * * * *